United States Patent [19]

Imaizumi

[11] Patent Number: 5,018,016
[45] Date of Patent: May 21, 1991

[54] DETECTING CIRCUIT WHICH REDUCES BUZZ IN A SOUND SIGNAL

[75] Inventor: Hideo Imaizumi, Nitta, Japan

[73] Assignee: Sanyo Electric Co., Ltd., Moriguchi, Japan

[21] Appl. No.: 365,885

[22] Filed: Jun. 14, 1989

[30] Foreign Application Priority Data

Jun. 20, 1988 [JP] Japan ................ 63-151766

[51] Int. Cl.$^5$ ............................................. H04N 5/62
[52] U.S. Cl. ..................................... 358/198; 358/167
[58] Field of Search ............... 358/198, 197, 188, 160, 358/167

[56] References Cited

U.S. PATENT DOCUMENTS

| | | | |
|---|---|---|---|
| 4,253,118 | 2/1981 | Flasza | 358/188 |
| 4,511,924 | 4/1985 | Griffis et al. | 358/197 |
| 4,513,323 | 4/1985 | Patel . | |
| 4,551,756 | 11/1985 | Ogawa et al. | 358/198 X |
| 4,602,287 | 7/1986 | Fockens | 358/197 |
| 4,630,119 | 12/1986 | Okuno | 358/198 |
| 4,716,464 | 12/1987 | Parker | 358/197 |
| 4,811,096 | 3/1989 | Gakumura | 358/188 X |
| 4,933,767 | 6/1990 | Hyakutake | 358/198 X |

FOREIGN PATENT DOCUMENTS

| | | |
|---|---|---|
| 55-136773 | 10/1980 | Japan . |
| 61-163780 | 7/1986 | Japan . |
| 62-145973 | 6/1987 | Japan . |
| 63-215176 | 9/1988 | Japan . |

*Primary Examiner*—Howard W. Britton
*Assistant Examiner*—Mark R. Powell
*Attorney, Agent, or Firm*—Armstrong, Nikaido, Marmelstein, Kubovcik & Murray

[57] ABSTRACT

A television receiver includes a correction filter (10) having an inclination characteristic opposite to a slope of a video intermediate frequency signal. The video intermediate frequency signal correction by the correction filter is applied to a PLL circuit (11) and the PLL circuit generates a carrier signal of a video intermediate frequency locked to the video intermediate frequency signal. A synchronous detecting circuit (16) detects the video intermediate frequency signal before the correction in response to the signal output from the PLL circuit and outputs a video signal. At the same time, it generates a sound FM signal corresponding to a beat of the carrier signal of the video intermediate frequency and a carrier signal of a sound intermediate frequency. A sound detecting circuit (20) detects the sound FM signal and outputs a sound signal.

4 Claims, 3 Drawing Sheets

FIG.1
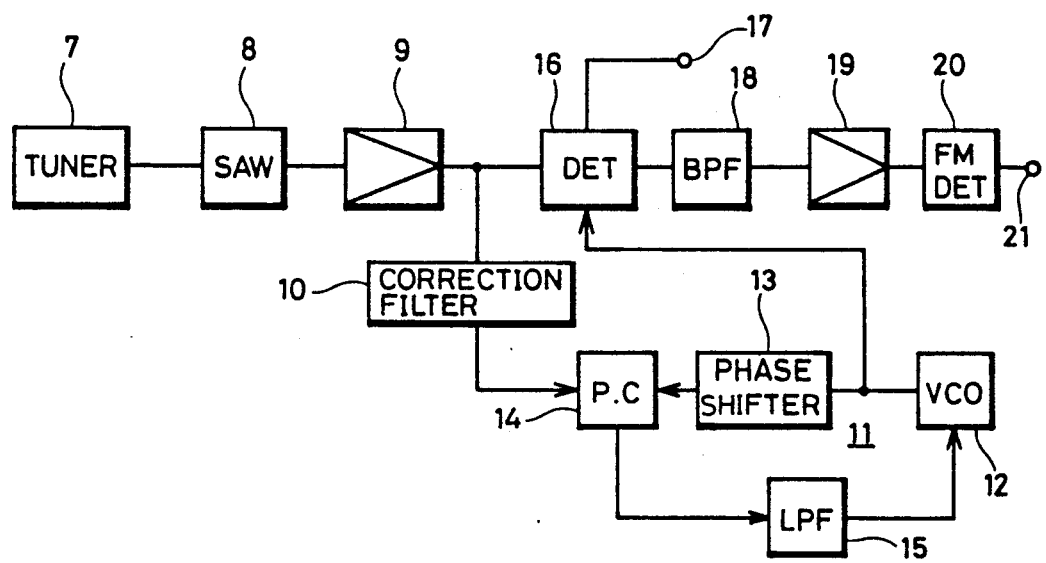
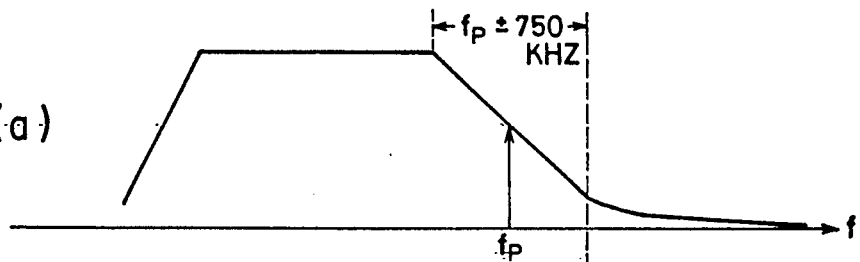
FIG.4(a)
FIG.4(b)
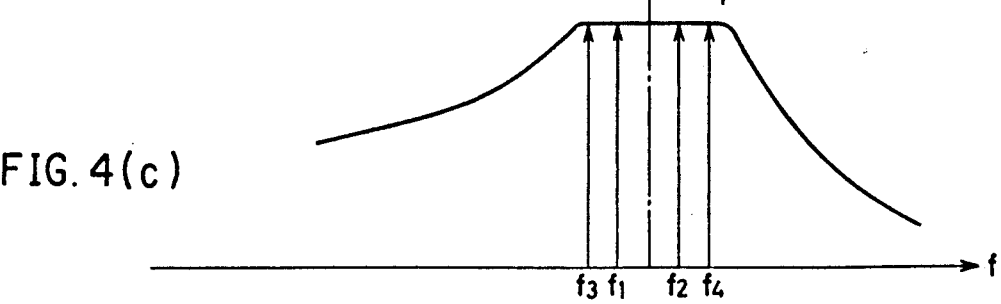
FIG.4(c)

FIG. 2 PRIOR ART
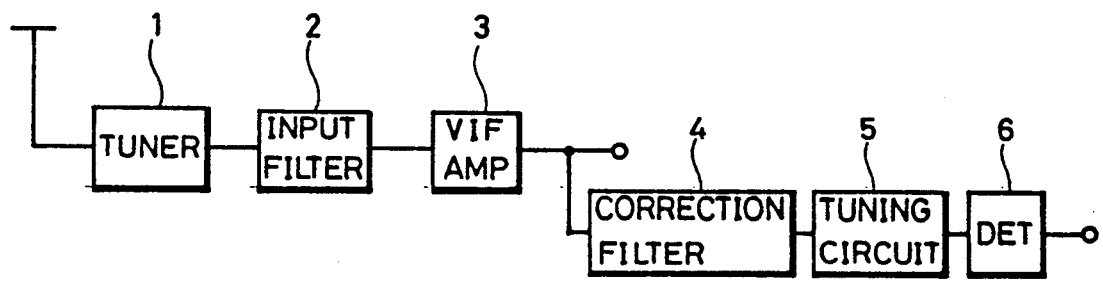
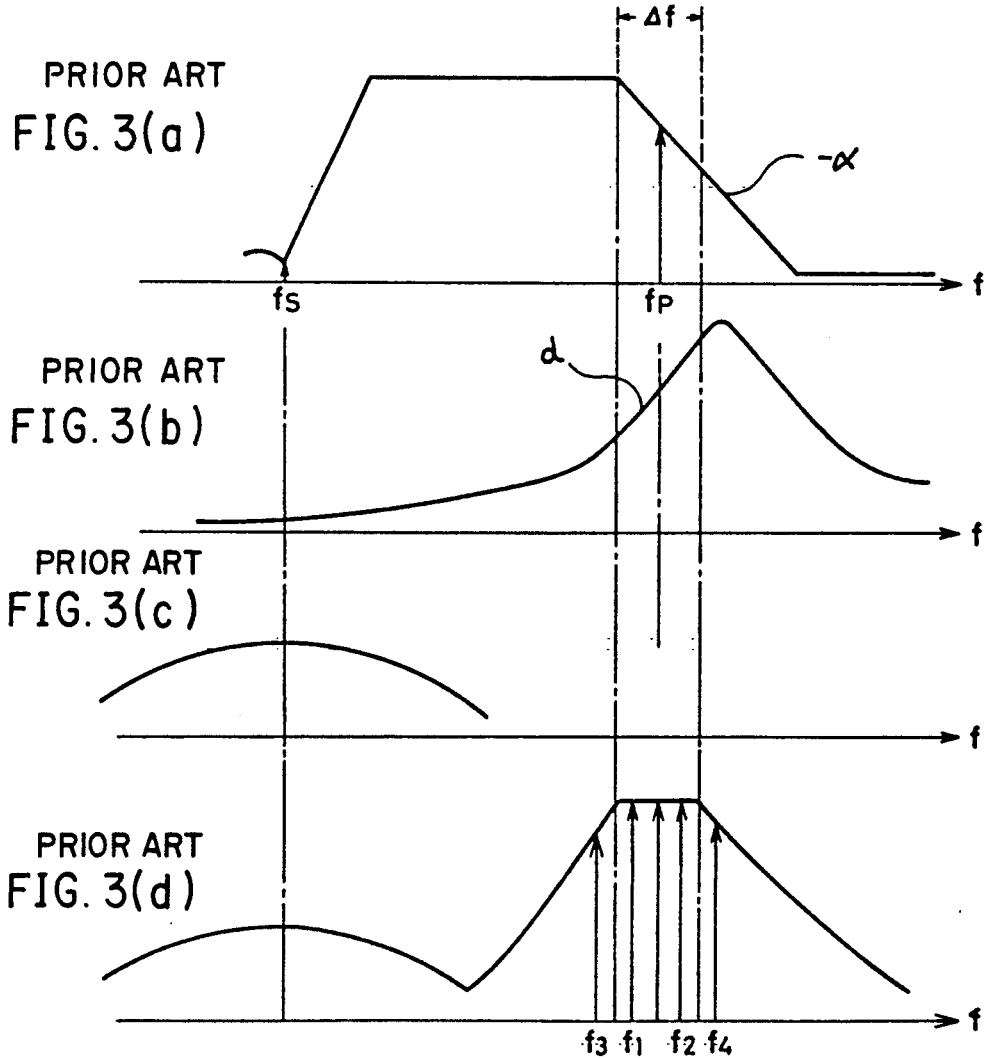
PRIOR ART
FIG. 3(a)
PRIOR ART
FIG. 3(b)
PRIOR ART
FIG. 3(c)
PRIOR ART
FIG. 3(d)

DETECTING CIRCUIT WHICH REDUCES BUZZ IN A SOUND SIGNAL

BACKGROUND OF THE INVENTION

1. Field of the Invention

The present invention relates to a detecting circuit of a phase-locked loop (PLL) system for use in a television (TV) receiver or the like and particularly to a detecting circuit which reduces buzz produced in a sound signal.

2. Description of the Background Art

The intercarrier system is conventionally used as a sound receiving system in television broadcasting. The intercarrier system is excellent in simplicity of circuit structure, stable operation and the manufacturing cost compared with a separate carrier system. However, the intercarrier system has a disadvantage that a buzz is produced in a sound signal after detection due to an influence of a slope through a filter provided at a preceding stage of a video intermediate frequency (IF) amplifying circuit. A television receiver which reduces generation of the buzz is described in Japanese Patent Laying-Open No. 55-136773. FIG. 2 is a circuit diagram showing the above mentioned television receiver. This television receiver comprises a tuner 1, an input filter 2, a video IF amplifying circuit 3, a correction filter for correcting a slope through the video IF amplifying circuit 3, a tuning circuit 5 and an intercarrier detecting circuit 6. The frequency characteristic of the input filter 2 shown in FIG. 2 is set to an inclination—α of a slope around a video IF frequency fp. Accordingly, the frequency characteristic of the correction filter 4 is set to an inverse inclination α so that a predetermined band f of the above mentioned inclination—α may be flat as shown in (b) of FIG. 3. The tuning circuit 5 amplifies a sound IF frequency fs and its frequency characteristic is set as shown in (c) of FIG. 3. Consequently, the general frequency characteristic for the range reaching the input stage of the intercarrier detecting circuit 6 is as shown in (d) of FIG. 3. The intercarrier detecting circuit 6 detects a sound FM signal of 4.5 MHz as a beat of the video IF frequency fp and the sound IF frequency fs. On that occasion, a sideband of the video IF frequency fp is not influenced by the slope and the sound FM signal is not phase-modulated as can be clearly seen from (d) of FIG. 3. In consequence, even if the sound FM signal is demodulated by an FM demodulating circuit (not shown) in the succeeding stage, buzz is not produced in the sound signal.

However, in the circuit shown in FIG. 2, frequency components f1 to f4 of the sideband of the video IF signal are multiplied by a frequency fs of the sound at the time of detecting the sound FM signal of 4.5 MHz in the intercarrier detecting circuit 6 and as a result interference waves (for example, f1–fs, f2–fs, f3–f5 and f4–fs) causing buzz are generated. In general, the sound FM signal is subjected to amplitude limitation by a limiter and then it is demodulated. The differential phase (DP) characteristic of the sound FM signal is liable to be deteriorated in the multiplier, the limiter and the FM demodulating circuit and if the DP characteristic is deteriorated, the above mentioned interference waves undergo phase modulation. If the phase-modulated interference waves are FM demodulated, phase-modulated components are FM-detected and accordingly buzz is generated in the detected sound signal.

Since the correction filter 4 shown in (b) of FIG. 3 is provided in a signal path in the circuit of FIG. 2, the amplitude of the sound IF signal is considerably limited by the frequency characteristic, causing deterioration of the S/N ratio of the sound signal.

SUMMARY OF THE INVENTION

Therefore, a principle object of the present invention is to provide a detecting circuit of a television receiver, which can reduce generation of buzz and can detect a sound signal of a large amplitude.

The present invention is a detecting circuit which detects a video signal and a sound signal in response to a video intermediate frequency (IF)signal output from a video IF contained in a television receiver. In this detecting circuit, a slope of the video IF signal output from the video intermediate frequency amplifier is corrected and the video intermediate frequency signal having the corrected slope is phase-locked to a video IF signal in a corrected phase-locked loop. In response to the phase-locked signal, the video IF signal before the correction is synchronously detected and a sound FM signal is output. This sound FM signal is detected, whereby a sound signal is output.

Consequently, according to the present invention, correction means for correcting the slope of the video IF signal is provided and accordingly the phase-locked loop means can be phase-locked to the video IF signal not subjected to phase modulation. As a result, the sound FM signal output from the phase-locked loop means is detected, whereby a sound signal having a large amplitude can be obtained.

In addition, correction filter means is provided in a preceding stage of the phase-locked loop means, which makes it possible to limit a frequency band of an input signal of the phase-locked loop means. Thus, a synchronous coupling loop can be locked stably to the video IF signal. For example, a conventional detecting circuit of a phase-locked loop system has a disadvantage that when the levels of input video carrier signal and sound carrier signal are reversed, the detecting circuit is locked to the sound carrier signal since the synchronous coupling loop means has a relatively wide capture range. On the other hand, according to the present invention, the correction filter means is provided in the preceding stage of the phase-locked loop means and the level of the sound carrier signal can be attenuated satisfactorily. Thus, the above described disadvantage can be overcome.

According to the present invention, it is not necessary to provide correction filter means in a path of a video IF signal input to the synchronous detecting means and accordingly a sound signal of a large amplitude can be detected by sound detecting means without attenuation of the sound carrier signal. Thus, deterioration of the S/N ratio can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a circuit diagram showing an embodiment of the present invention.

FIG. 2 is a circuit diagram showing a conventional television receiver.

FIGS. 3(a) to 3(d) are characteristic diagrams for explanation of the television receiver of FIG. 2.

FIGS. 4(a) to 4(c) and FIG. 5 are characteristic diagrams for explanation of the embodiment of FIG. 1.

DESCRIPTION OF THE PREFERRED EMBODIMENT

Figure 5:
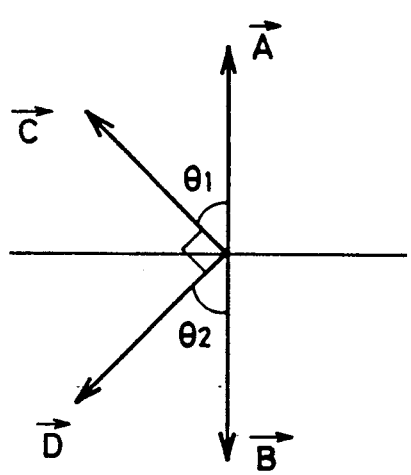

FIG. 1 is a circuit diagram showing an embodiment of the present invention. This embodiment comprises: a tuner 7; a surface acoustic wave (SAW) filter 8 having a slope for compensating for a vestigial sideband system as a television signal transmission system; a video IF amplifying circuit 9 for amplifying a video IF signal from the SAW filter 8; a correction filter 10 having an inclination opposite to the slope near a video IF frequency fp of the SAW filter 8; a PLL circuit 11 including a voltage controlled oscillator (VCO) 12 which oscillates at the video IF frequency fp, a phase shifting circuit 13, a phase comparing circuit 14 and a low-pass filter 15; a detecting circuit 16 which detects synchronously a video IF signal in response to an oscillation output signal of the VCO 12; a video output terminal 17 where the video signal detected by the detecting circuit 16 is obtained; a bandpass filter 18 through which a sound FM signal of 4.5 MHz from the detecting circuit 16 passes; a limiter amplifier 19 which limits an amplitude of the sound FM signal from the bandpass filter 18; and an FM detecting circuit 20 which detects the sound FM signal from the limiter amplifier 19.

In the circuit shown in FIG. 1, an output signal of the tuner 7 is applied to the SAW filter 8 having a frequency characteristic as shown in FIG. 4(a) and then it is applied to the video IF amplifying circuit 9, so that a video IF signal is amplified. The amplified video IF signal passes through the correction filter 10 and then it is applied to the phase comparing circuit 14. The frequency characteristic of the correction filter 10 for a range attaining the preceding stage of the phase comparing circuit 14 is as shown in FIG. 4(c) since the center frequency is set to have a characteristic just opposite to the slope in FIG. 4(a). As is evident from FIG. 4(c), levels of sidebands f1, f2, f3 and f4 of the video IF signal applied to the phase comparing circuit 14 become flat. In consequence, the video IF signal not phase-modulated is applied to the phase comparing circuit 14 and it is compared with an oscillation output signal of the VCO 12. An error voltage dependent on the phase difference is applied to the VCO 12 through the low-pass filter 15 so that a PLL loop is formed. Accordingly, the phase of the oscillation output signal of the VCO 12 is locked at the phase of the video IF signal externally applied. The phase shifting circuit 13 provided in the PLL circuit 11 is used to set a phase difference of the two signals input to the detecting circuit 16 to 180°. For example, it is assumed that the output video IF signal of the video IF amplifying circuit 9 is represented as a vector $\overline{A}$ in FIG. 5 and that the oscillation output signal of the VCO 12 is represented as a vector $\overline{B}$. Assuming that phase advancement through the correction filter 10 is $\theta 1$, the video IF signal having passed through the correction filter 10 is represented as a vector $\overline{C}$. Consequently, a signal applied from the phase shifting circuit 13 to the phase comparing circuit 14 is a signal represented as a vector $\overline{D}$ having a phase difference of 90° with respect to the above mentioned vector $\overline{C}$.

A phase shift amount in the phase shifting circuit 13 in FIG. 1 is set to $-\theta 2$. Thus, the phase difference of the two inputs signals of the detecting circuit 16 can be set to 180° and synchronous detection can be effected. The relation of the phase amounts $\theta 1$ and $\theta 2$ is as indicated below as is evident from FIG. 5.

$$|\theta 1| + |\theta 2| = |\pi/2|$$

When a carrier wave of the video IF frequency fp not affected by phase modulation from the VCO 12 is applied to the detecting circuit 16, the video signal and the sound signal are detected and the detected video signal is obtained at the video output terminal 17. A sound FM signal of 4.5 MHz corresponding to a beat of the sound carrier wave and the above mentioned carrier wave is detected and the detected sound FM signal is applied to the limiter amplifier 19 through the bandpass filter 18. The sound FM signal having an amplitude limited by the limiter amplifier 19 is detected by the FM detecting circuit 20 and a sound signal is obtained at the sound output terminal 21. Since the sound FM signal applied to the FM detecting circuit 20 is not affected by phase modulation, buzz is not generated in the sound signal after the FM detection.

Figure 6:
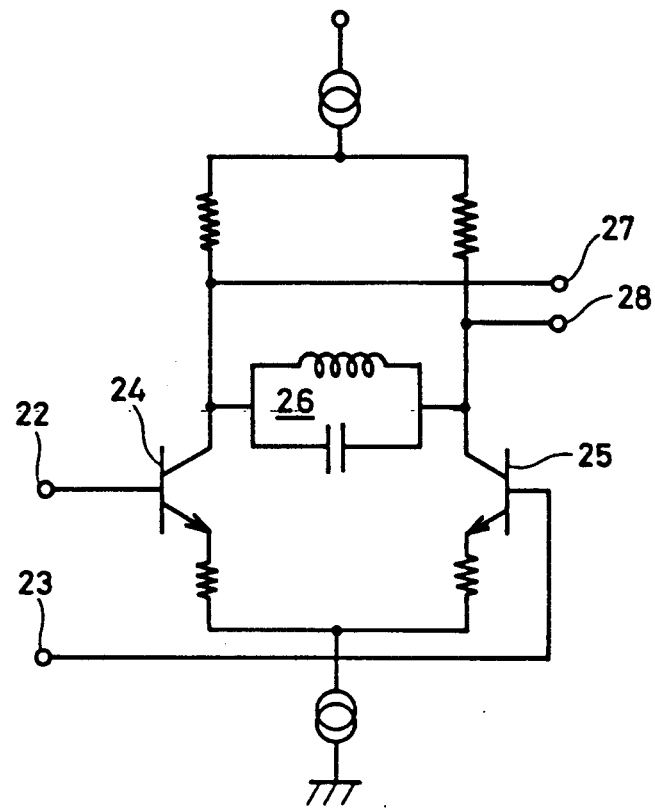
FIG. 6 is a circuit diagram showing a specified example of the correction filter of FIG. 1.

FIG. 6 is a circuit diagram showing a specified example of the correction filter 10 of FIG. 1. The correction filter 10 comprises input terminals 22 and 23 to which video IF signals of opposite phases are applied, transistors 24 and 25 differentially connected and having respective bases to which the input terminals 22 and 23 are connected, and a resonating circuit 26 connected between the collectors of the transistors 24 and 25, whereby an output signal having a bandpass characteristic is obtained at each of output terminals 27 and 28.

Figure 7:
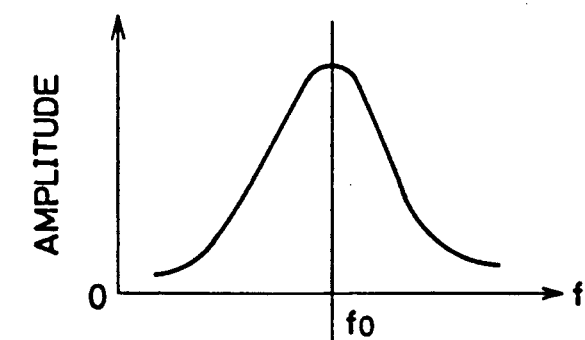
FIGS. 7 and 8 are characteristic diagrams for explanation of the correction filter of FIG. 6.
Figure 8:
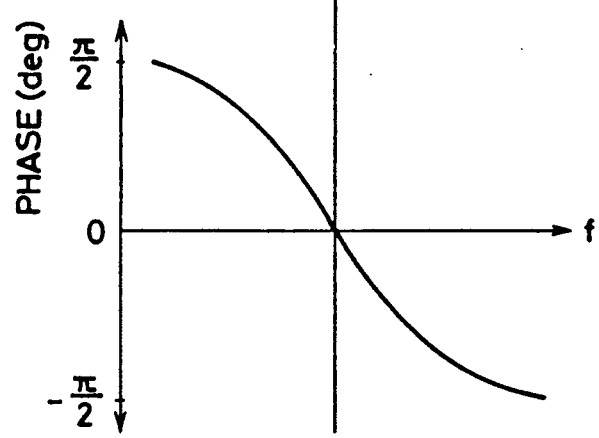

FIG. 7 shows a frequency versus amplitude characteristic of the resonating circuit 26 of FIG. 6 and FIG. 8 is a characteristic diagram showing a frequency versus phase characteristic of the resonating circuit 26. The phase characteristic around the center frequency of in FIGS. 7 and 8 is linear but it has a large change amount of phase with respect to the frequency. Further, in the region of the phase approaching $\pi/2$, the amplitude is considerably attenuated and gain cannot be obtained in the PLL circuit in the succeeding stage. In addition, the amplitude characteristic is non-linear in that region, which is unfavorable. Therefore, the phase advancing amount of the resonating circuit 26 is most preferably in the range from 45° to 75° in view of the phase and amplitude characteristics.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A detecting circuit for detecting a video signal and a sound signal in response to a video intermediate frequency signal output from video intermediate frequency amplifying means contained in a television receiver, said detecting circuit comprising:
   correction filter means for receiving said video intermediate frequency signal and for correcting a slope of said video intermediate frequency signal;
   phase-locked loop means for receiving an output signal of said correction filter means and for phaselocking the same to said video intermediate frequency signal;

synchronous detecting means, responsive to an output signal of said phase-locked loop means, for synchronously detecting said video intermediate frequency signal before correction and for outputting a sound FM signal; and sound signal detecting means, responsive to the sound FM signal output from said synchronous detecting means, for detecting a sound signal.

2. A detecting circuit of a television receiver in accordance with claim 1, wherein said phase-locked loop means comprises phase comparing means for receiving the output signal of said correction filter means, low-pass filter means for outputting an error voltage according to a phase difference provided by phase comparison by said phase comparing means, variable voltage control oscillating means for generating a signal at a frequency of said video intermediate frequency signal in response to the voltage output from said low-pass filter means, and phase shifting means for shifting a phase of an oscillation output of said variable voltage control oscillating means and for applying the shifted phase to said phase comparing means.

3. A detecting circuit of a television receiver in accordance with claim 1, wherein a phase shift amount in said correction filter means is set in a range from 45° to 75°.

4. A detecting circuit of a television receiver in accordance with claim 1, wherein said correction filter means comprises differential amplifying circuit for amplifying said video intermediate frequency signal, and a resonating circuit connected between outputs of said differential amplifying circuit and having a phase shift amount set in the range from 45° to 75°.

* * * * *